Dec. 11, 1956 F. W. MILLER 2,773,387
LIQUID LEVEL GAGE
Filed Aug. 18, 1953 3 Sheets-Sheet 1
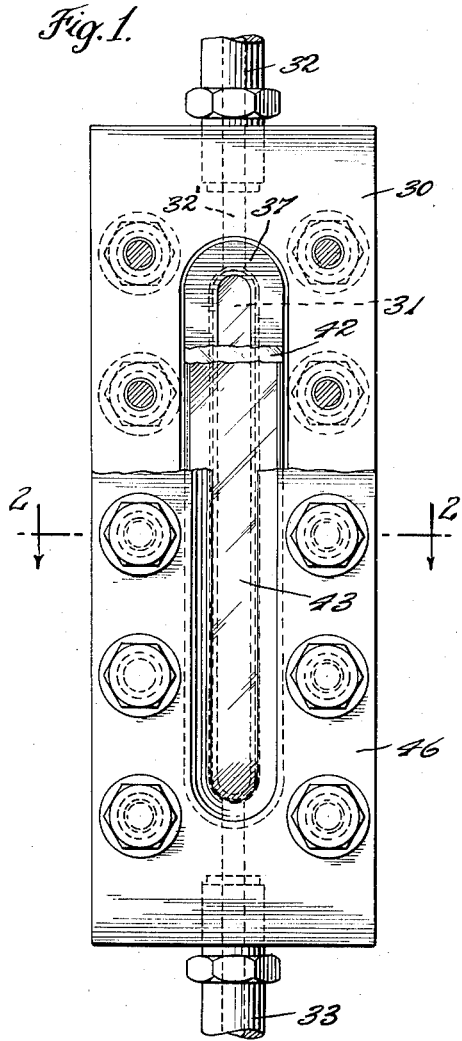
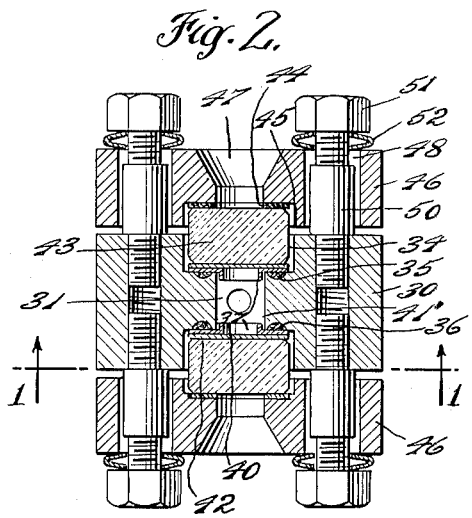
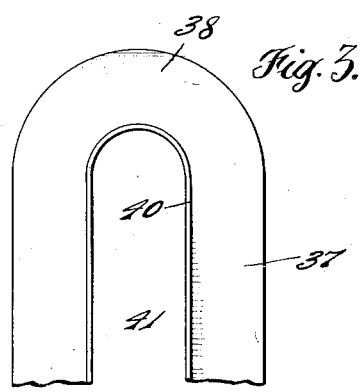
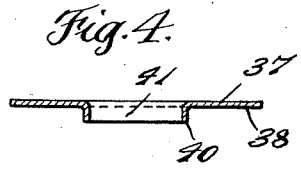
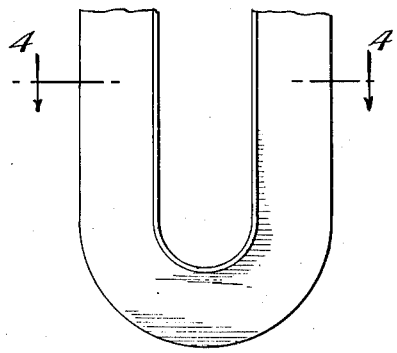
INVENTOR
Frank W. Miller
ATTORNEYS.

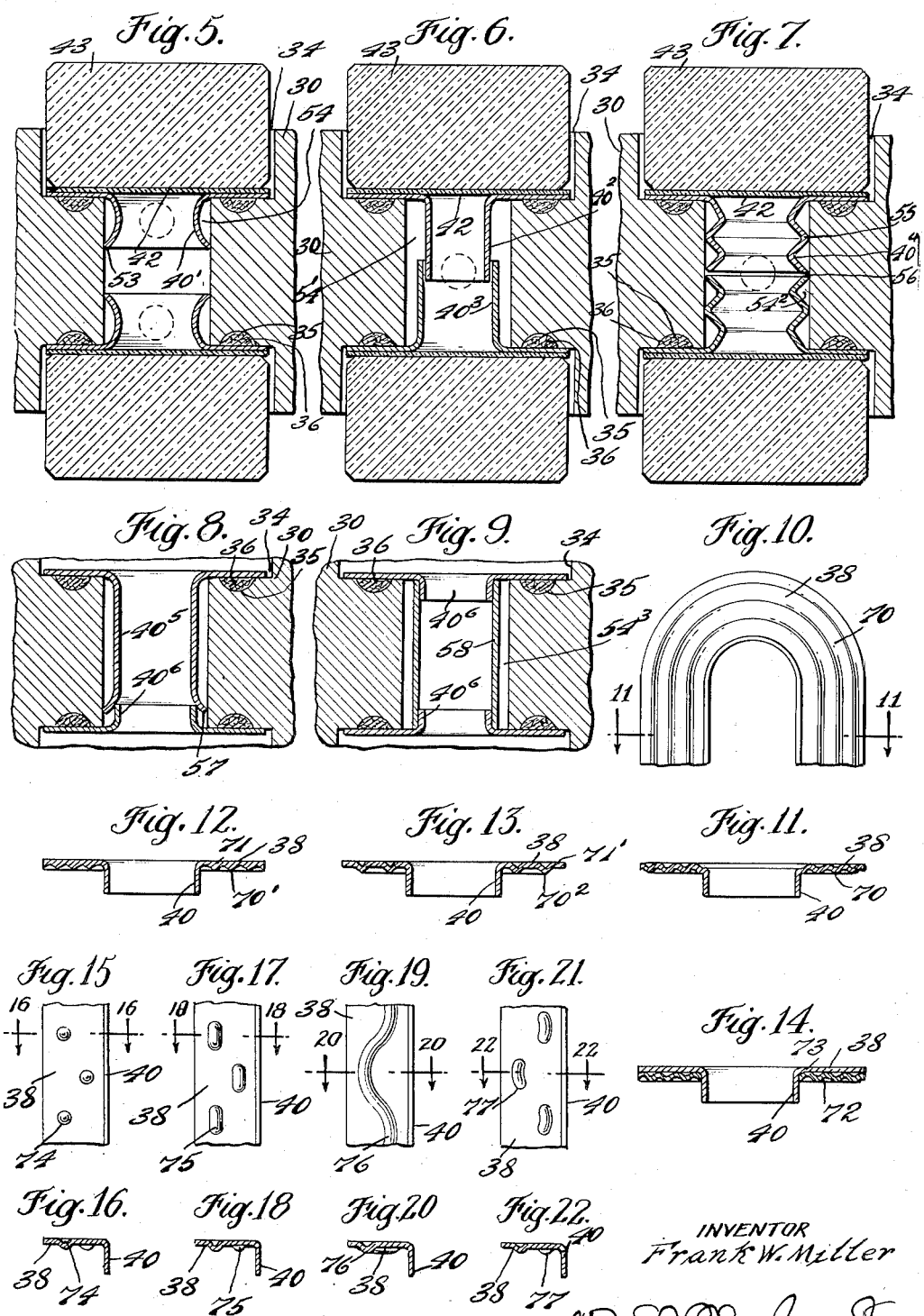

Dec. 11, 1956 F. W. MILLER 2,773,387
LIQUID LEVEL GAGE
Filed Aug. 18, 1953
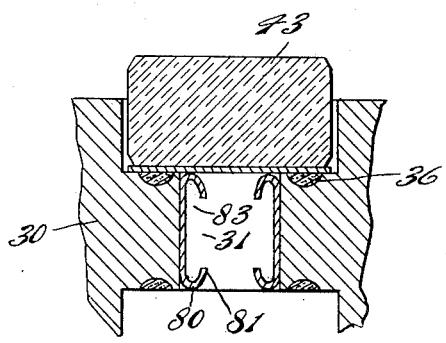
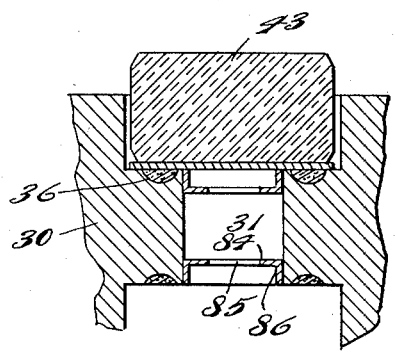
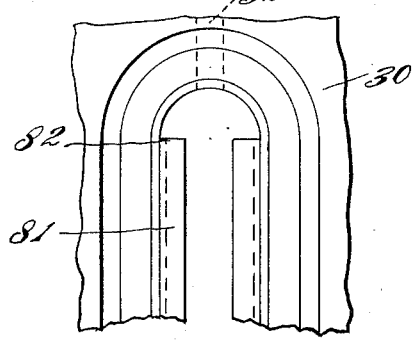
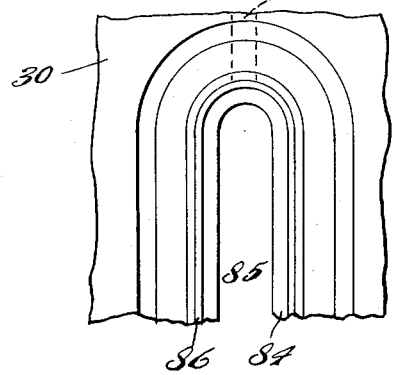
INVENTOR
Frank W. Miller.
BY
ATTORNEYS.

United States Patent Office 2,773,387
Patented Dec. 11, 1956

2,773,387

LIQUID LEVEL GAGE

Frank W. Miller, Montgomery County, Pa., assignor to Yarnall-Waring Company, Philadelphia, Pa., a corporation of Pennsylvania Application August 18, 1953, Serial No. 374,962

15 Claims. (Cl. 73—330)

The present invention relates to liquid level gages of the type of boiler water gages and the like.

A purpose of the invention is to increase the service life of liquid level gages and particularly to avoid the tendency of such gages to cloud.

A further purpose is to protect the interior transparent element of the gages against attack by condensate.

A further purpose is to protect the pressure packing for liquid level gages prior to installation.

A further purpose is to prevent the accumulation of corrosion products at a position adjoining the glass or the mica layer at the inside of the glass.

Further purposes appear in the specification and in the claims.

In the drawings I have chosen to illustrate a few only of the numerous embodiments in which my invention may appear selecting the forms shown from the standpoints of convenience in illustration, satisfactory operation and clear demonstration of the principles involved.

Figure 1 is a front elevation of a boiler water level gage in accordance with the invention, partly in section on the line 1—1 of Figure 2.

Figure 2 is a section on the line 2—2 of Figure 1.

Figure 3 is an interior enlarged elevation of one of the shields according to the invention as employed in Figures 1 and 2.

Figure 4 is a section on the line 4—4 of Figure 3.

Figures 5 to 9 inclusive are fragmentary enlarged sections corresponding to Figure 2 omitting the covers and bolts, and in some cases omitting the gage glasses and mica sheets.

Figure 10 is a fragmentary view similar to Figure 3 showing a modified form of shield.

Figure 11 is a section of Figure 10 on the line 11—11.

Figures 12 to 14 are views similar to Figure 11 showing variations in the shim construction.

Figures 15, 17, 19 and 21 are fragmentary inside elevations of variations in the shields, these variations being shown also in Figures 16, 18, 20 and 22 which are respectively sections on the line 16—16 of Figure 15, the line 18—18 of Figure 17, the line 20—20 of Figure 19 and the line 22—22 of Figure 21.

Figure 23 is a fragmentary horizontal section of a variation in the gage of the invention.

Figure 24 is a fragmentary front elevation of the gage of Figure 23 at the top with the front cover and front gage glass removed.

Figure 25 is a view corresponding to Figure 23 showing a further variation.

Figure 26 is a fragmentary elevation of Figure 25 at the top with the front cover and front gage glass removed.

Great difficulty has been encountered in liquid level gage such as boiler water gages due to the attack on the transparent elements by liquid and especially by freshly formed condensate. Because of this tendency it is common to employ mica sheets to protect the interiors of the gage glasses. However, the mica sheets are attacked, resulting in a clouding of the gage, and necessitating replacement.

I have discovered that thin metallic shims, shields, deflectors or guards, preferably placed between the gage body and the transparent elements, and where mica sheets are used, placed between the gage body and the mica sheets, and extending inwardly beyond the adjoining corner of the gage body, preferably extending into the interior of the column, tend to guide condensate away from the mica sheet and protect it.

I have also discovered that such shields cooperate well with the pressure packing and can even be used to protect the pressure packing during transportation and use.

One of the most serious problems in water gage maintenance under high pressure conditions is created by the very rapid deterioration of the mica protection on the interior of the gage glasses or of the gage glass itself. The condensate flowing down the interior of the gage follows the gasket line along the sides of the gage slot due to capillarity or surface tension. The mica face tends to be undercut along the gasket line, and failure is encouraged by the following secondary causes:

1. The undercut mica adjacent to the gasket is subjected to an area of edge pressure, and the cut layers of mica over the gasket tend to blow out and initiate a leakage path through the mica between the glass and the gasket.

2. The undercut mica tends to establish a leakage path through the mica to the glass face and thus attack and damage the gage glass. The glass becomes cloudy with corrosion products and finally mechanical glass failure occurs or leakage takes place around the sealing line.

The metallic shield having a shim portion interposed between the mica and the gasket with the inner edge extending into the space of the column in the body of the gage, and formed to deflect or redirect freshly formed condensate away from the mica, is of great benefit.

The shield may be used of any suitable metal or alloy, but is preferably made of chromium-nickel stainless steel, straight chromium stainless steel, beryllium copper, Phosphor bronze, naval brass or any other metal or alloy sufficiently corrosion resistant. It is desirable that the shield shall be capable of deforming under the packing pressure, and therefore it should have a thickness between 0.004 and 0.040 inch and preferably between .008 and .015 inch.

Figures 1 to 4 show a liquid level gage having a metallic body 30 provided with a vertical interior slot 31 forming a liquid column, and connected by pipe 32 and passage 32' to the steam space at the top and by pipe 33 to the water space at the bottom.

On opposite faces the body is recessed at 34 to receive a gage glass and suitably has an endless packing recess 35 which receives pressure packing 36 of any character well known in the art.

Immediately adjoining the outside surface of pressure packing 36 is placed shield 37 in accordance with the invention, the shield consisting of very thin sheet or foil formed into an endless outwardly extending flange 38 and a preferably endless transversely extending flange 40 surrounding a slot 41 which is suitably slightly smaller than the slot of the body, so that the flange 40 clears from the body and leaves a space 41' between the flange and the body all around.

The shim portion 38 of the shield engages a protective layer suitably a mica sheet 42 covering the interior of the gage glass, as well known in the art.

On the outside of the mica sheet at each side is placed a gage glass 43 of any well known character, preferably suitably heat resisting and adequately strong to stand pressure. On the outside of the gage glass on both sides a gasket 44 extends around the gage glass and is held in place in a recess 45 of a cover 46 having a vertical slot 47 through which it is possible to see from one side of the gage to the other to observe the liquid level and to project illumination. The cover 46 has bolt openings 48 which receive studs 50 threaded into the body and receiving nuts 51 which tighten spring washers 52 against the outside of the cover to place the assembly under compression.

In the form shown in Figures 1 to 4, the shim portion has a finely finished or polished surface on the face contacting the mica. The outer edge is cut to the approximate outline of the gage glass.

It is important that the shim portion be sufficiently thin to conform to the mica face and to the gasket.

It has been found that, in the form of the device shown, the condensate running down the gage is deflected away from the mica and shows a tendency to flow along the groove between the inner flange of the shield and the inside of the body.

The shield tends to prevent the sharp cutting at the gasket line which formerly occurred, and instead permit only gradual erosion from a maximum at the center of the glass which gradually diminishes as approach is made to the shim inner flange at the side.

The shield also tends to eliminate a difficulty previously encountered due to flow of the sealing gasket against the mica which caused the mica to wrinkle or bulge inwardly with subsequent damage by crushing when it is reflattened against the glass by pressure. Interposing the shield maintains a constant surface relationship between the mica and the shim portion and the gasket flow to accomplish sealing takes place on the opposite face of the shim portion.

The shield also serves to maintain the visible gage opening free from interference from inward flow of the gasket material. Any inwardly projecting gasket material is deflected away from the gage glass and is not visible. It is therefore possible to use more flexible gaskets with the shim than would otherwise be employed.

The greater flexibility of the gasket improves the character of the seal.

The shield also can be used to protect the gasket against damage during handling or transit, and where desired the pressure gasket can be cemented or otherwise united to the shield for shipment.

The effect of the shield also prevents the accumulation of corrosion products which have collected on the mica, and have reduced visibility.

A greater degree of shielding can be obtained by using a transverse flange which extends further into the interior space of the gage. This can be accomplished not only by lengthening the flange 40, but also by flaring it outwardly as shown at 40' in Figure 5 so that the flange meets the interior of the slot of the gage body at 53 and forms channels 54 outside the shield which tend to carry condensate downwardly without allowing it to contact the mica sheet.

The shield can also be extended to form telescoping flange portions $40^2$ and $40^3$, as shown in Figure 6, leaving large channels 54' at either side to carry condensate downward. Suitable clearance of the telescoping flanges will provide for readjustment of pressure between the visible interior space and the channels 54'.

For pressure adjustment the flange can, if desired, be omitted at any point, suitably at the bottom if desired.

It will be evident that in a form such as that of Figures 5 and 6, the mica would be shielded from splashing at the meniscus. It will, of course, be understood that if splashing at the meniscus is desired to increase visibility, a compromise in the construction of the shim may be made.

The flange if desired may be vertically corrugated as illustrated on the flanges $40^4$ which have corrugations 55 in Figure 7. These flanges meet or substantially meet at the center at 56 and are capable of compressing to allow for differences in thickness of the body. In this form there are a series of vertical channels $54^2$ provided to carry condensate downwardly between the shield and the interior of the gage body.

The telescoping flanges need not be of the same length as shown in Figure 6, but one flange may be elongated as shown at $40^5$ in Figure 8 and the other may be short as shown at $40^6$. The outer end of the elongated flange may be desirably reversely flared as indicated at 57.

If desired, comparatively short flanges $40^6$ may be connected by an interior suitably endless band 58 which stands away from the wall to form a vertical channel $54^3$. The band 58 engages the outsides of the flanges $40^6$ at the ends and thus is held in place.

It will of course be evident that the shields may be produced by uniting together separate components rather than forming sheet or foil. If different components are united, it will be evident that different thicknesses can be used, and the transverse flange 40 could in that case be thicker than the outwardly extending flange 38.

In many cases it is desirable to have the shield surface which engages the gasket crimped or serrated to key the gasket and provide a greater margin of assurance against blow-out under high pressures.

Figures 10 and 11 show a shim portion having a serrated surface 70 on both sides, in engagement with the mica and also in engagement with the packing, the serrations running longitudinally around the outwardly extending flange 38. In Figure 12 the serrations 70' are only coined into the surface engaging the packing, while the mica contacts a flat surface 71. This assures a low and uniform stress on the mica which will not tend to crush it while keying the packing. The crimp may be more abrupt on one side $70^2$ to engage the packing than on the other surface 71' to engage the mica, as shown in Figure 13.

The shield may be composite, as in Figure 14, where a crimped endless strip 72 runs around the packing side of flange 38, and is joined to a flat portion 73 engaging the mica. The strip 72 may be held by cementing, spot-welding or mechanical uniting.

The serrations directed toward the packing side may be continuous, discontinuous, and/or wavy, and may vary in spacing. Figures 15 and 16 show spaced dome-shaped projections 74 in zig-zag relation; while Figures 17 and 18 show similarly spaced elongated buttons 75; Figures 19 and 20 show a sinuous bead 76; and Figures 21 and 22 illustrate curved buttons 77, the projections in the flange 38 always being toward the packing.

In some cases the shields or guards need not extend between the window and the body of the gage, although for many applications it is advantageous to have the shims between the window and the gage body to prevent entry of condensate close to the corner. In Figures 23 and 24 I show a gage construction in which the guard consists of a channel shaped guard 80 extending up along each side of the gage slot 31 and having reverse bends 81 adjoining each window which extend to the top and desirably terminate in upstanding prongs 82. The guards 80 may be held in place in any suitable manner as by welding or springing into engagement with the slot of the gage body. The reverse bends provide spaces 83 at each side which protect the window from condensate.

In the form of Figures 25 and 26, shields 84 extend throughout the edges of the interior body slot at the front and the back, being placed close to each window, and having slots 85 through which the light can pass. The shields may desirably be flanged at 86 to engage the sides of the slots secured either by spring action, or by welding as desired. Condensate running down through the opening 32' in the top of the gage is thus guided away from the windows at the front and the back.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my invention.

I claim:

1. In a liquid level gage, a gage body having an interior vertical passage with side openings, connections to the passage at the top and bottom, opposed gage glasses on opposite sides of the body closing the side openings and adapted to transmit light through the side openings, covers provided with openings generally corresponding to the openings in the body, located on the outsides of the gage glasses and means for applying pressure to the covers to anchor the gage glasses in place against the body, in combination with metallic shields, each having a thickness of between 0.004 and 0.040", each having an opening generally corresponding with the openings in the body, interposed between the gage glasses and the body and having a flange extending generally at right angles to the shield and in spaced relation to the gage body inwardly into the vertical passage continuously over the top and sides of the opening.

2. A gage of claim 1, in which a pressure packing is interposed between each shield and the body.

3. A gage of claim 1, in which each shield extends into the space of the vertical passage and then back against the wall of the vertical passage at a position remote from the gage glass.

4. A gage of claim 1, in which the shields from the respective gage glasses meet and telescope at the interior of the vertical passage.

5. A gage of claim 1, in which the shields from the respective gage glasses are corrugated and the corrugated portions extend inwardly into approximately meeting relation.

6. A gage of claim 1, in which the respective shields are flanged inwardly, and a connecting wall connects the flanges at the top and sides in spaced relation from the walls of the vertical passage.

7. A gage of claim 1, in which the shields have a deformed surface interposed between the gage body and the glass.

8. A gage of claim 1, in which the shields have a corrugated surface interposed between the gage glass and the body.

9. A gage of claim 1, in which the flange forms an endless band having a top, sides and bottom portion, adapted to divert condensate from the gage glass.

10. A shield of claim 9, in which the transversely extending flange is longitudinally corrugated.

11. A shield of claim 9, in which the outwardly extending shim portion is deformed.

12. A shield of claim 9, in which the outwardly extending shim portion is longitudinally corrugated.

13. A set of shields of claim 9, in which the transversely extending flanges telescope one within another.

14. A set of shields of claim 9, in combination with an endless band which conforms to the shape and size of the outside of the transversely extending flange of each shield, and in operative position extends from one opposed shield to the other.

15. An insert type water gage having a window, having a body provided with a vertical interior passage, having gage glasses in opposed relation closing the window and having means for holding the gage glasses in position, in combination with a thin metal shield extending through the body adjacent the gage glass at the window and having an endless flange extension at right angles to the shield protruding into the passage adjacent the window, diverging into the interior of the vertical passage in spaced relation from the gage body to protect the window from condensate which normally tends to follow the corner of the window and the body, the flange also extending across the space of the passage at the upper end of the window, thereby diverting condensate which runs down the passage from above.

References Cited in the file of this patent

UNITED STATES PATENTS

| 1,195,911 | Comp | Aug. 22, 1916 |
| 2,201,542 | Kinderman | May 20, 1940 |

FOREIGN PATENTS

| 599,792 | Germany | July 3, 1932 |